C. L. ERVIN.
WAVE OR TIDE MOTOR.
APPLICATION FILED JAN. 22, 1919.
1,376,140.
Patented Apr. 26, 1921.
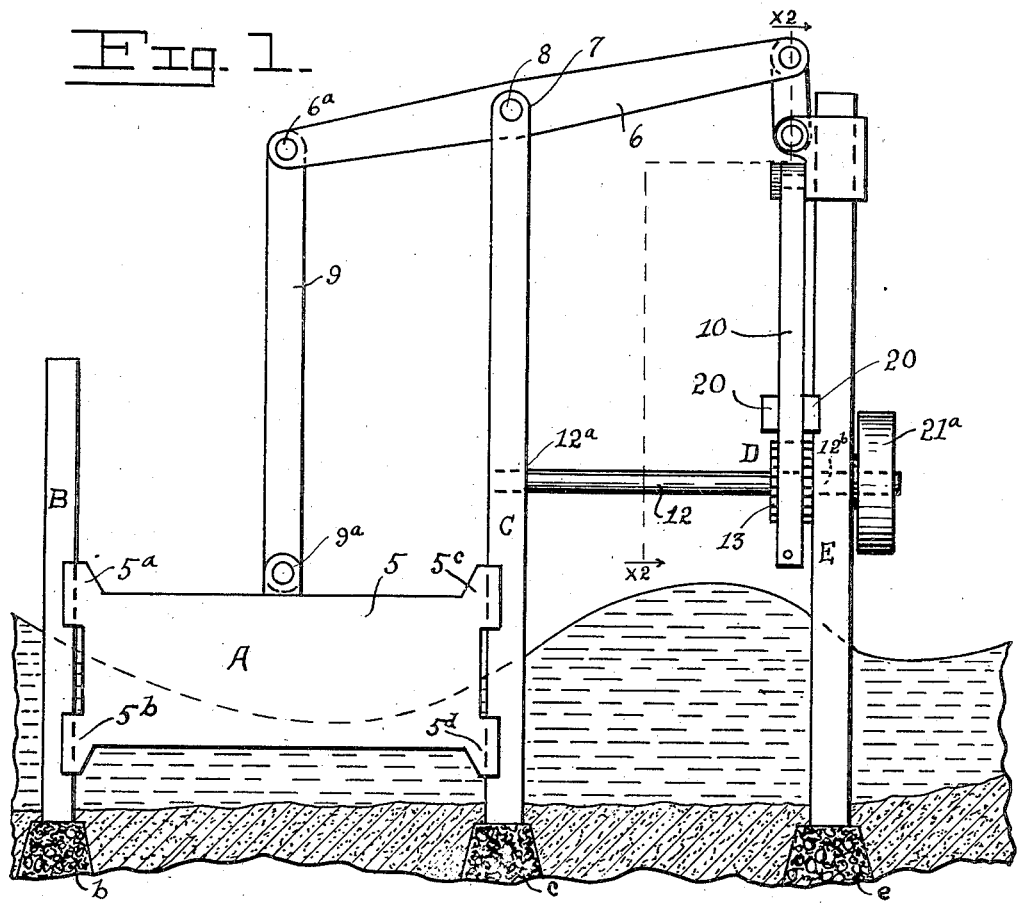
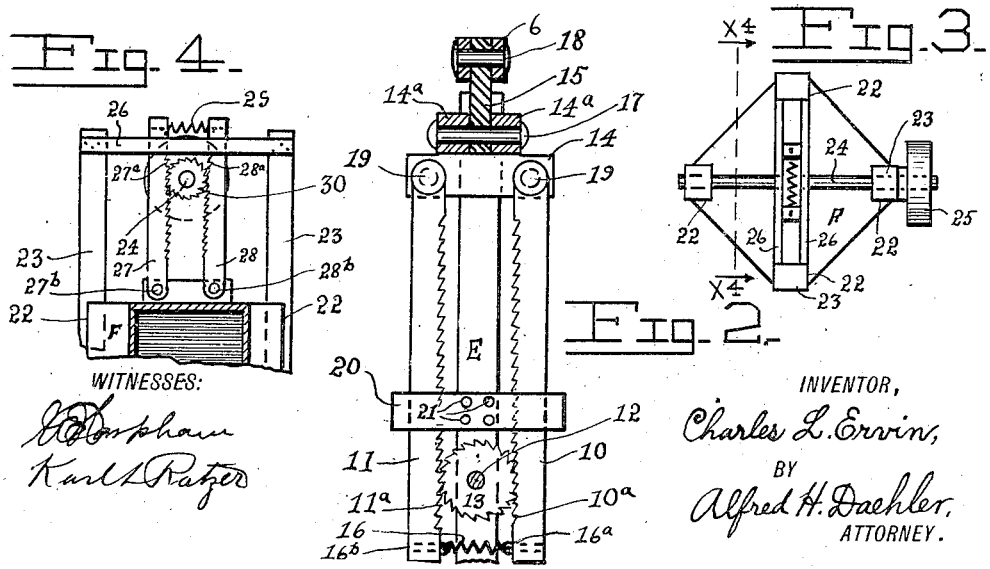
INVENTOR,
Charles L. Ervin,
BY
Alfred H. Daehler,
ATTORNEY.

UNITED STATES PATENT OFFICE.

CHARLES L. ERVIN, OF LOS ANGELES, CALIFORNIA.

WAVE OR TIDE MOTOR.

1,376,140.          Specification of Letters Patent.      Patented Apr. 26, 1921.

Application filed January 22, 1919. Serial No. 272,604.

*To all whom it may concern:*

Be it known that I, CHARLES L. ERVIN, a citizen of the United States, residing at Los Angeles, in the county of Los Angeles and State of California, have invented new and useful Improvements in Wave or Tide Motors, of which the following is a specification.

This invention relates to wave or tide motors, and it has for its object to provide an improved wave or tide motor whereby the energy of the waves or tides of the sea and like bodies of water may be converted into useful work.

In accordance with the invention a float or buoyant body adapted to be vertically reciprocated by successive waves is provided, and such float or body is preferably guided in a vertical path by means of a plurality of guide piles between which the float is confined; in order to provide for the conversion of the energy imparted to the float by the waves into rotary motion of a shaft I preferably provide a pair of rack bars each of which is provided with ratchet teeth, and a ratchet wheel adapted to be actuated by said rack bars. The teeth of one of the rack bars are adapted for working engagement with the teeth of the ratchet wheel when the pair of rack bars is moved upwardly in response to the action of a wave or tide and the teeth of the other of the rack bars are adapted for engagement with the teeth of the ratchet wheel when the float descends by gravity into the trough between succeeding waves or descends with the lowering tide. The ratchet wheel is preferably fixedly secured to a rotatable shaft journaled in the framework or piles and such rotatable shaft may be further provided with a fly wheel or power wheel which may be belted or otherwise geared to a dynamo, air compressor or other energy transmission means or driven device.

A further object of the invention is to provide a wave or tide motor of the character above stated which will be relatively simple and inexpensive in construction and organization when its advantages such as freedom from liability to derangement, high efficiency and general superiority in service are considered.

With the above and other objects in view, the invention consists in the novel and useful provision, formation, combination, association and relative arrangement of parts, members and features, all as hereinafter described, shown in the drawing, and finally pointed out in claims.

In the drawing:

Figure 1 is a side elevation of a wave motor constructed and organized in accordance with the invention, the ocean bottom and waves being fragmentarily shown in section;

Fig. 2 is a vertical partly sectional view taken on the line $x^2$—$x^2$, Fig. 1 and looking in the direction of the appended arrows;

Fig. 3 is a plan view of a modified form of wave or tide motor; and

Fig. 4 is a vertical sectional view taken on the line $x^4$—$x^4$, Fig. 3, and looking in the direction of the appended arrows.

The parts in the several figures are designated by reference characters.

Referring with particularity to the drawing, in the embodiment of the invention shown in Figs. 1 and 2 thereof, A designates a float, B designates a guide pile, C designates a guide pile and pivot support combined, D designates means for converting movement of the float into rotary motion, and E designates means for supporting the means D and shown as a pile.

The piles B, C, and E are each preferably firmly fixed in or on the ocean bottom as by insertion in a concrete foundation, as at $b$, $c$, and $e$, respectively. The guide piles B may be provided in suitable number and in such arrangement about the float A as may be required by the shape and size of the same in any given installation.

The float A preferably consists of a heavy hollow buoyant body 5 provided with an upper bifurcated guide $5^a$ and a lower bifurcated guide $5^b$ adjacent to and adapted to engage each of the guide piles B and an upper bifurcated guide $5^c$ and a lower bifurcated guide $5^d$ adapted to engage the pile C. The float A is so confined to a vertical path of travel by the vertically disposed piles B and C.

A walking beam 6 is pivoted to the pile C near its bifurcated upper end 7 as by means of a pivot 8 passed through suitable bores in the prongs of such upper end 7 and through a suitable bore provided in the walking beam X intermediate the ends thereof. One end of the walking beam 6 is pivotally connected with the upper end of a link 9 as at $6^a$. The lower end of the link 9 is pivotally connected to the float A as at $9^a$.

The means D preferably comprises a rack bar 10 having downwardly pointed ratchet teeth 10ª on the inwardly directed face thereof, a rack bar 11 having upwardly pointed ratchet teeth 11ª, a rotatable shaft 12, a ratchet wheel 13 fixedly secured to said shaft, a cross head 14 from which the rack bars 10 and 11 depend, a link 15 connecting said cross-head 14 and the end of the walking beam opposite the end connected with the float, and yielding means shown as a tension spring 16 connecting the lower end of the rack bars to hold the same in engagement with the ratchet wheel.

The cross-head 14 is adapted to slide vertically upon the supporting pile E, being apertured from end to end to fit the pile which serves as a guide therefor. The link 15 is pivoted at its lower end between two ears 14ª provided on the cross-head 14 as by means of a pivot 17 and is pivoted to the respective walking beam end as by means of a pivot 18. The rack bars are each pivoted to the cross-head 14 at their upper ends as by a pivot 19 and in such manner that they are constrained to oscillate in a plane at right angles to the plane of oscillation of the walking beam. At their lower ends the rack bars are guided and confined in their proper plane of movement by a pair of horizontal transverse guide bars 20 secured to the pile E as by means of bolts 21. The tension spring 16 has its one end connected to the lower end of rack bar 10 as at 16ª and its other end connected to rack bar 11 as at 16ᵇ. The shaft 12 is rotatably supported at its one end by the pile C at 12ª and further rotatably supported by the pile E at 12ᵇ and preferably lies in the plane of oscillation of the walking beam. The ratchet wheel 13 is secured to the shaft 12 so as to lie in the plane of oscillation of the rack bars 10 and 11. A fly wheel or power wheel 21ª is secured to the shaft 12 in any suitable manner.

In the modified form of the invention shown in Figs. 3 and 4, a float F comprising a suitable buoyant body having vertical guideways at 22 is provided, and a vertical pile 23 is provided in each guideway to confine the float to a vertical path of travel. A rotatable shaft 24 is suitably journaled in oppositely disposed piles near the upper ends thereof and in such manner as to extend across the float F. A fly wheel or power wheel 25 is secured to the shaft 24 at any suitable point. A pair of horizontal guide members 26 extend across the float at right angles to the shaft 24 and such members 26 may be supported by oppositely disposed piles 23. A rack bar 27 having upwardly pointed teeth 27ª is pivotally secured at its lower end to the float F as at 27ᵇ, and a rack bar 28 having downwardly pointed teeth 28ª is pivotally secured to the float F as at 28ᵇ. These rack bars 27 and 28 extend upwardly from the float F and are confined between the guide members 26, the upper ends of the rack bars 27 and 28 being connected by a tension spring 29. A ratchet wheel 30 is fixedly secured to the shaft 24 between the horizontal guide members 26 and between the rack bars 27 and 28 and in position to be engaged by the teeth 27ª and 28ª successively as the float in its rise and fall causes the vertical reciprocation of the rack bars.

In installing my improved motor for use as a tide motor, the same may be built in any suitable sheltered harbor, bay or the like, which in certain cases may be provided by building a break-water and so protecting the motor from violent storms and even waves, as in such an installation a very large and massive float, or plurality of such floats may be provided, to the end that considerable power may be derived from the tides, the float or floats slowly rising and sinking in response to changes in the tide from high to low. The power may be taken from the rotatable shaft of the motor by means of step up or high speed gearing or transmission mechanism and so continuously drive mechanism at relatively high speed, the power so derived being directly proportioned to the weight of the massive float, deduction being made for the friction of the motor.

Another method of installing or building the motor when the same is to act in response to the tides only, is to make a large excavation inland, build or install the motor with its massive float therein, and then connect with the body of water furnishing the energy as by means of a conduit or conduits of suitable cross-sectional area.

The operation, method of use and advantages of the invention will be readily understood from the foregoing disclosure, taken in connection with the accompanying drawing and the following statement:

As the waves or tides successively affect the float A or F the same is caused to reciprocate vertically and actuate the rack bars, directly, in the form of the invention shown in Figs. 3 and 4, and through the walking beam and connections, in the form of the invention shown in Figs. 1 and 2. The rack bars being actuated in such manner as to cause their reciprocation in the plane of the ratchet wheel, in both forms of the invention, as they move upwardly the rack bar having the upwardly directed teeth acts against the teeth of the ratchet wheel, the tension spring allowing the opposite rack bar with downwardly directed teeth to move outwardly and ride over the teeth of the ratchet wheel. On the downward stroke of the rack bars the rack bar with the downwardly directed teeth will engage the teeth of the ratchet wheel, the rack bar with the upwardly directed teeth sliding over the ratchet wheel during this part of the cycle of operation. It will be understood that such sliding action or free movement one rack bar at a time is due to the formation of the ratchet teeth which are pointed oppositely to the direction of ratchet wheel rotation.

Having thus disclosed my invention I claim and desire to secure by Letters Patent:

1. A motor of the character disclosed, comprising a float, means constraining said float to a vertical path of travel, a rack bar having downwardly directed ratchet teeth, a rack bar having upwardly directed ratchet teeth, means of pivotal connection between one end of each of said rack bars and said float confining the corresponding ends of said rack bars to a rectilinear vertical path of travel, a ratchet wheel disposed between said rack bars and directly actuated alternately thereby in one direction of rotation only, guide means adjacent to said ratchet wheel for confining said rack bars to the plane of said ratchet wheel, spring means uniting the ends of the rack bars opposite their pivotally connected ends and permitting alternate oscillation of said rack bars about their respective means of pivotal connection.

2. A motor of the character disclosed, comprising a float, means constraining said float to a vertical path of travel, a rack bar having downwardly directed ratchet teeth, a rack bar having upwardly directed ratchet teeth, means of pivotal connection between one end of each of said rack bars and said float confining the corresponding ends of said rack bars to a rectilinear vertical path of travel, a ratchet wheel disposed between said rack bars and directly actuated alternately thereby in one direction of rotation only, guide means adjacent to said ratchet wheel for confining said rack bars to the plane of said ratchet wheel, spring means uniting the ends of the rack bars opposite their pivotally connected ends and permitting alternate oscillation of said rack bars about their respective means of pivotal connection; said means of pivotal connection comprising a sliding member and a guide for said member.

3. A motor of the character disclosed, comprising a float, means constraining said float to a vertical path of travel, a rack bar having downwardly directed ratchet teeth, a rack bar having upwardly directed ratchet teeth, means of pivotal connection between one end of each of said rack bars and said float confining the corresponding ends of said rack bars to a rectilinear vertical path of travel and providing for oscillatory movement of the opposite ends of said rack bars, a ratchet wheel disposed between said rack bars and directly actuated alternately thereby in one direction of rotation only, guide means adjacent to said ratchet wheel for confining said rack bars to the plane of said ratchet wheel, spring means uniting the ends of the rack bars opposite their pivotally connected ends and permitting alternate oscillation of said rack bars about their respective means of pivotal connection; said means of pivotal connection comprising a sliding member and a guide for said member and said guide means confining said rack bars comprising a pair of horizontally disposed members between which the rack bars are disposed.

In testimony whereof I have signed my name to this specification in the presence of two subscribing witnesses.

CHARLES L. ERVIN.

Witnesses:
ALFRED H. DAEHLER,
J. W. BURNS.